United States Patent
Takishita et al.

(12) 
(10) Patent No.: US 6,687,213 B1
(45) Date of Patent: Feb. 3, 2004

(54) OPTICAL RECORDING MEDIUM HAVING PRE-FORMED LAND-PREPITS AND METHOD FOR PRODUCING SAME

(75) Inventors: Toshihiko Takishita, Yamanashi (JP); Masahiro Kato, Tokorozawa (JP); Eiji Muramatsu, Tokorozawa (JP); Kunihiko Horikawa, Tokorozawa (JP); Shoji Taniguchi, Tokorozawa (JP); Atsushi Yamaguchi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/544,547

(22) Filed: Apr. 6, 2000

(30) Foreign Application Priority Data

Apr. 8, 1999 (JP) ........................................... 11-101466

(51) Int. Cl.$^7$ ............................................... G11B 7/24
(52) U.S. Cl. .................................... 369/275.4; 428/64.4
(58) Field of Search .......................... 369/16, 17, 272, 369/275.1, 275.4, 277, 13.35, 275.3, 278, 279, 280, 275.2; 428/64.1, 64.3, 64.4; 430/320, 321

(56) References Cited

U.S. PATENT DOCUMENTS

| | | | | |
|---|---|---|---|---|
| 4,947,384 A | * | 8/1990 | Suzuki et al. ............... | 369/100 |
| 5,084,860 A | * | 1/1992 | Maeda et al. .......... | 369/109.02 |
| 5,402,411 A | * | 3/1995 | Maeda et al. ............. | 369/275.2 |
| 5,407,720 A | * | 4/1995 | Omata ..................... | 346/135.1 |
| 5,477,524 A | * | 12/1995 | Deguchi et al. ........ | 369/109.02 |
| 5,581,539 A | * | 12/1996 | Horie et al. ............... | 369/275.4 |
| 5,604,726 A | * | 2/1997 | Karube .................... | 369/275.4 |
| 5,648,954 A | * | 7/1997 | Satoh ...................... | 369/275.4 |
| 5,933,411 A | * | 8/1999 | Inui et al. ................. | 369/275.4 |
| 5,978,327 A | * | 11/1999 | Kuroda et al. ........... | 369/275.3 |
| 6,054,199 A | * | 4/2000 | Sugiyama et al. ......... | 428/64.1 |
| 6,181,672 B1 | * | 1/2001 | Muramatsu et al. ..... | 369/275.4 |
| 6,404,729 B1 | * | 6/2002 | Yamaoka et al. ........ | 369/275.4 |
| 6,490,240 B1 | * | 12/2002 | Usami ..................... | 369/275.4 |
| 6,504,815 B1 | * | 1/2003 | Fujii et al. ............... | 369/275.4 |
| 6,535,477 B1 | * | 3/2003 | Muramatsu et al. ..... | 369/275.4 |
| 6,599,607 B1 | * | 7/2003 | Takishita et al. .......... | 428/64.4 |

* cited by examiner

*Primary Examiner*—Tan Dinh
(74) *Attorney, Agent, or Firm*—Sughrue Mion, PLLC

(57) ABSTRACT

An optical recording medium which can produce a read signal free from waveform distortion during reproduction of information. The optical recording medium comprises groove information tracks on which information pits carrying information data is to be formed, and prepit tracks provided with a plurality of previously formed land prepits connected to the groove information tracks. The groove information tracks and the prepit tracks are arranged in alternation. The groove information track has a track width smaller in at least a part of each of sections in which the land prepit exists than in sections in which no land prepit exists.

10 Claims, 11 Drawing Sheets

RADIAL DIRECTION OF DISC

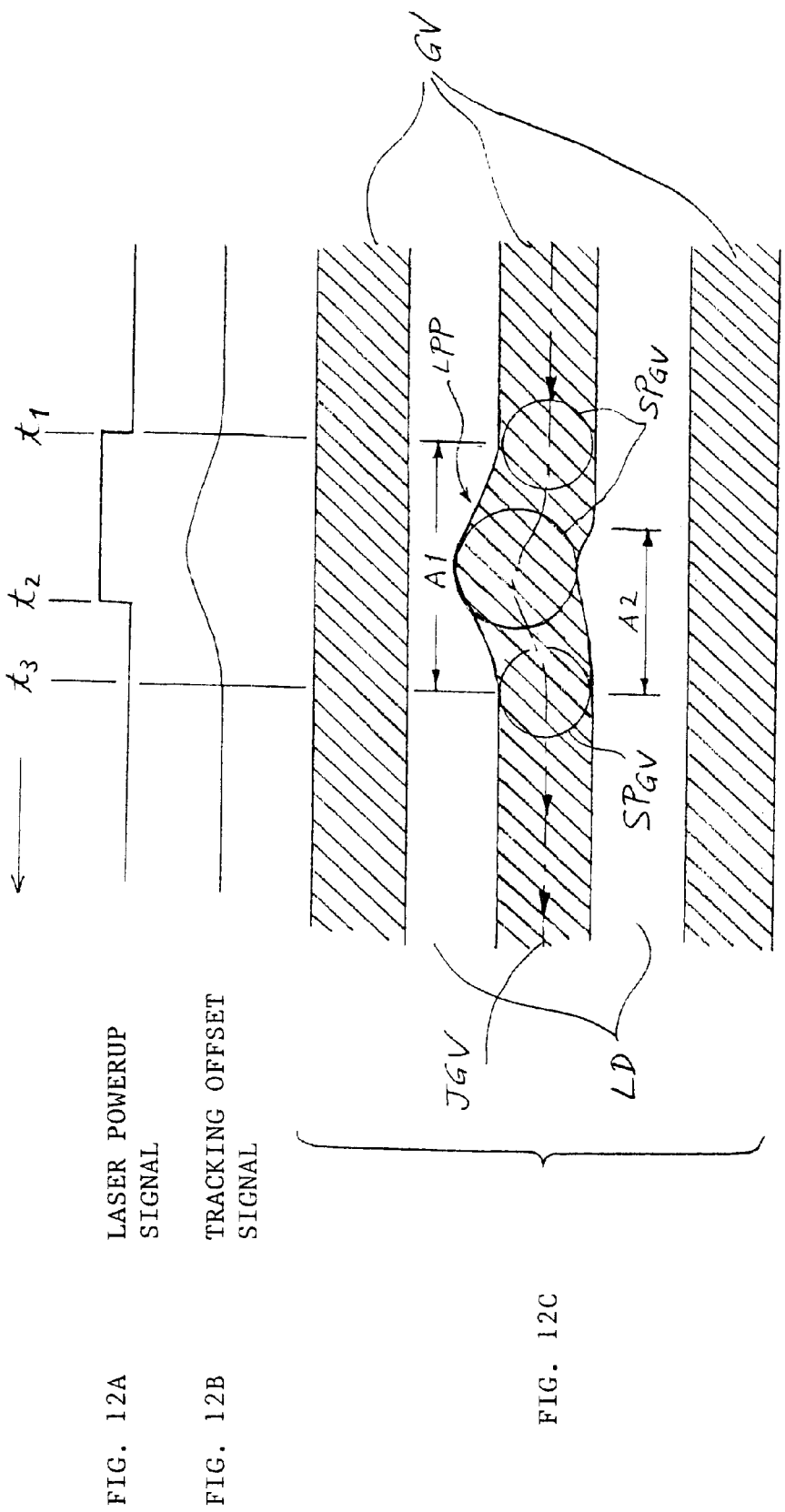

OPTICAL RECORDING MEDIUM HAVING PRE-FORMED LAND-PREPITS AND METHOD FOR PRODUCING SAME

BACKGROUND OF THE INVENTION

1. Field of the Invention

The present invention relates to an optical recording medium which allows a user to record information data.

2. Description of the Related Art

Currently, a write-once type DVD (Digital Versatile Disc)-R and a rewritable DVD-RW have been commercially produced as optical recording media.

FIG. 1 is a perspective view illustrating the structure of a recording surface and a cross section of a DVD-R or a DVD-RW (hereinafter simply referred to as the "DVD"). FIG. 1 illustrates the configuration of the DVD before information data (audio data, video data, and computer data) is recorded thereon by an information recording/reproducing apparatus.

As illustrated in FIG. 1, convex (when viewed from the viewing point of the figure) groove tracks GV and concave (similarly when viewed from the viewing point of the figure) land tracks LD are previously formed spirally or concentrically in alternation on a recording layer R of the DVD before information data is recorded. As shown in FIG. 1, the DVD has a transparent substrate B which attaches to the recording layer R at the substrate's surface having the groove and land tracks.

The land tracks LD are provided with a plurality of previously formed land prepits LPP which serve as addresses for recognizing particular positions on the groove tracks GV and as recording timing. Each of the land prepit LPP is formed to connect two adjacent groove tracks GV, and its bottom surface (indicated by hatching) is continuous with the bottom surfaces (similarly, indicated by hatching) of associated groove tracks GV.

An information recording/reproducing apparatus for recording information data on the DVD as mentioned above reads the land prepits LPP from the DVD to recognize the position above a particular groove track GV, and irradiates the groove track GV with recording beam light in accordance with information data. In this process, heat is conducted to a region irradiated with the recording beam light to form information pits PT in that region as illustrated in FIG. 2.

However, when the recording beam light from the DVD recorder is irradiated to a position including a land prepit LPP on a groove track GV, deformed information pits are formed such as information pits $PT_1$, $PT_2$ illustrated in FIG. 2. This is because the heat generated when the recording beam is irradiated also affects a portion of the land prepit LPP.

Thus, when information data is reproduced from the DVD having a recording configuration as illustrated in FIG. 2, waveform distortion can occur in a read signal generated by reading the above-mentioned deformed information pits $PT_1$, $PT_2$, resulting in a higher read error rate.

OBJECT AND SUMMARY OF THE INVENTION

The present invention has been made in view of the problem mentioned above, and its object is to provide an optical recording medium which is capable of producing a read signal free from waveform distortion when information is reproduced therefrom.

An optical recording medium according to the present invention comprises groove information tracks on which information pits carrying information data are to be formed, and land prepit tracks provided with a plurality of previously formed land prepits connected to the groove information track, wherein the groove information tracks and the land prepit tracks are arranged in alternation. The groove information track has a smaller track width in at least a part of each of sections in which the land prepit exists than in sections in which no land prepit exists.

BRIEF DESCRIPTION OF THE DRAWINGS

FIGS. 12A through 12C are diagrams showing another embodiment of the present invention, in which FIG. 12A shows a laser power up control signal, FIG. 12B shows a tracking off set control signal, and FIG. 12C shows the configuration of groove tracks on the recording surface of the DVD.

DETAILED DESCRIPTION OF THE EMBODIMENTS

An embodiment of the present invention will hereinafter be described in detail with reference to the accompanying drawings.

Figure 3:
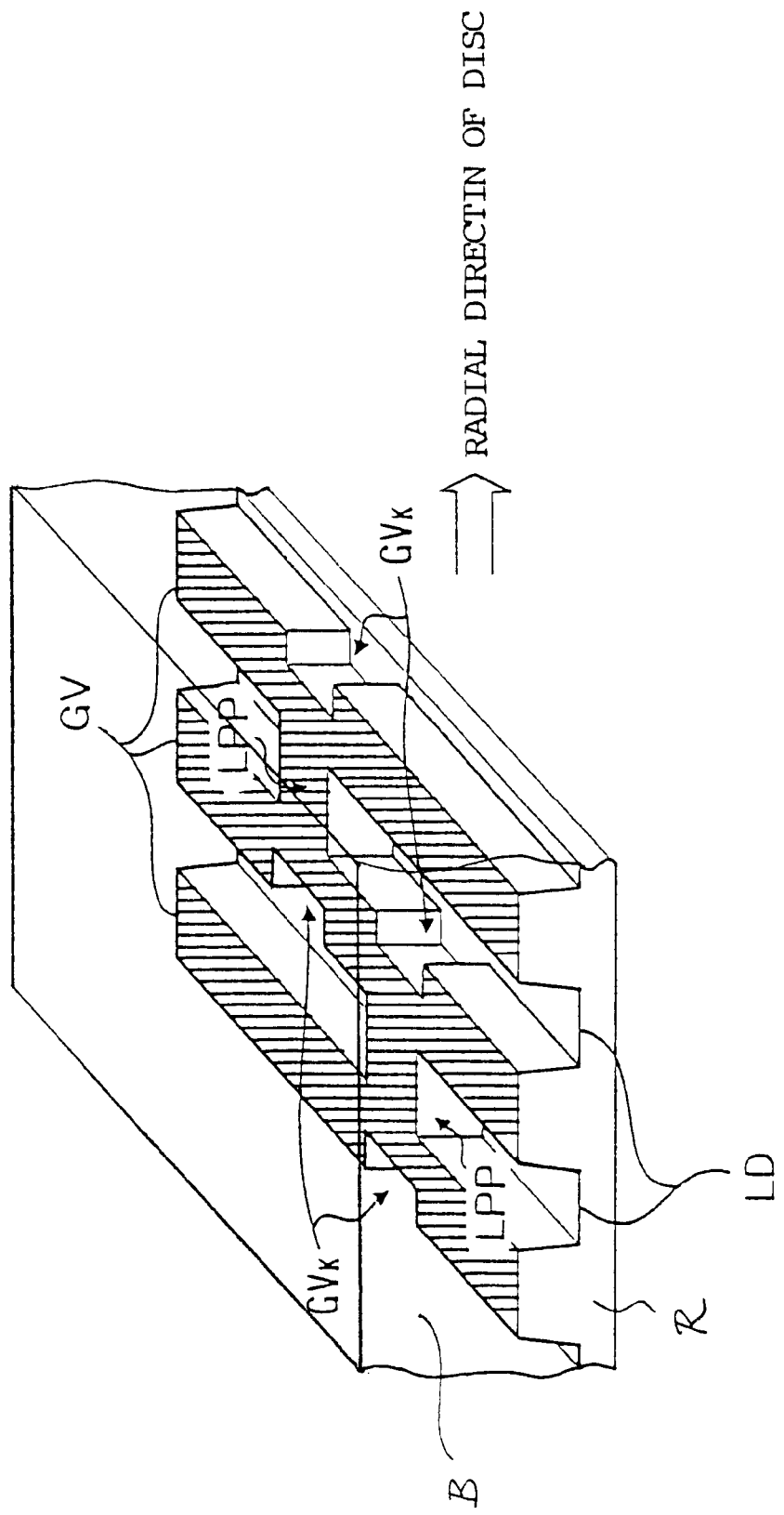
FIG. 3 is a perspective view illustrating a recording surface and a cross section of a write-once or rewritable DVD according to the present invention.

FIG. 3 is a perspective view illustrating the structure of a recording surface of a write-once or rewritable DVD according to the present invention as an optical recording medium. FIG. 3 illustrates the configuration before information data is recorded by an information recording/reproducing apparatus, later described.

As illustrated in FIG. 3, convex (when viewed from the viewing point of the figure) groove tracks GV and concave (similarly when viewed from the viewing point of the figure) land tracks LD are previously formed spirally or concentrically in alternation on a recording layer R of the DVD according to the present invention before information data is recorded. As shown in FIG. 3, the DVD has a transparent substrate B which attaches to the recording layer R at the substrate's surface having the groove and land tracks.

The land tracks LD is previously formed with a plurality of land prepits LPP for use by an information recording/reproducing apparatus as addresses for recognizing particular positions on the groove tracks GV, and as recording timing when it records information data on the DVD. Also, as can be seen in FIG. 3, the track width of the groove tracks GV is reduced by a groove track indentation $GV_K$ as illustrated, in each portion connected to the land prepit LPP.

Figure 4:
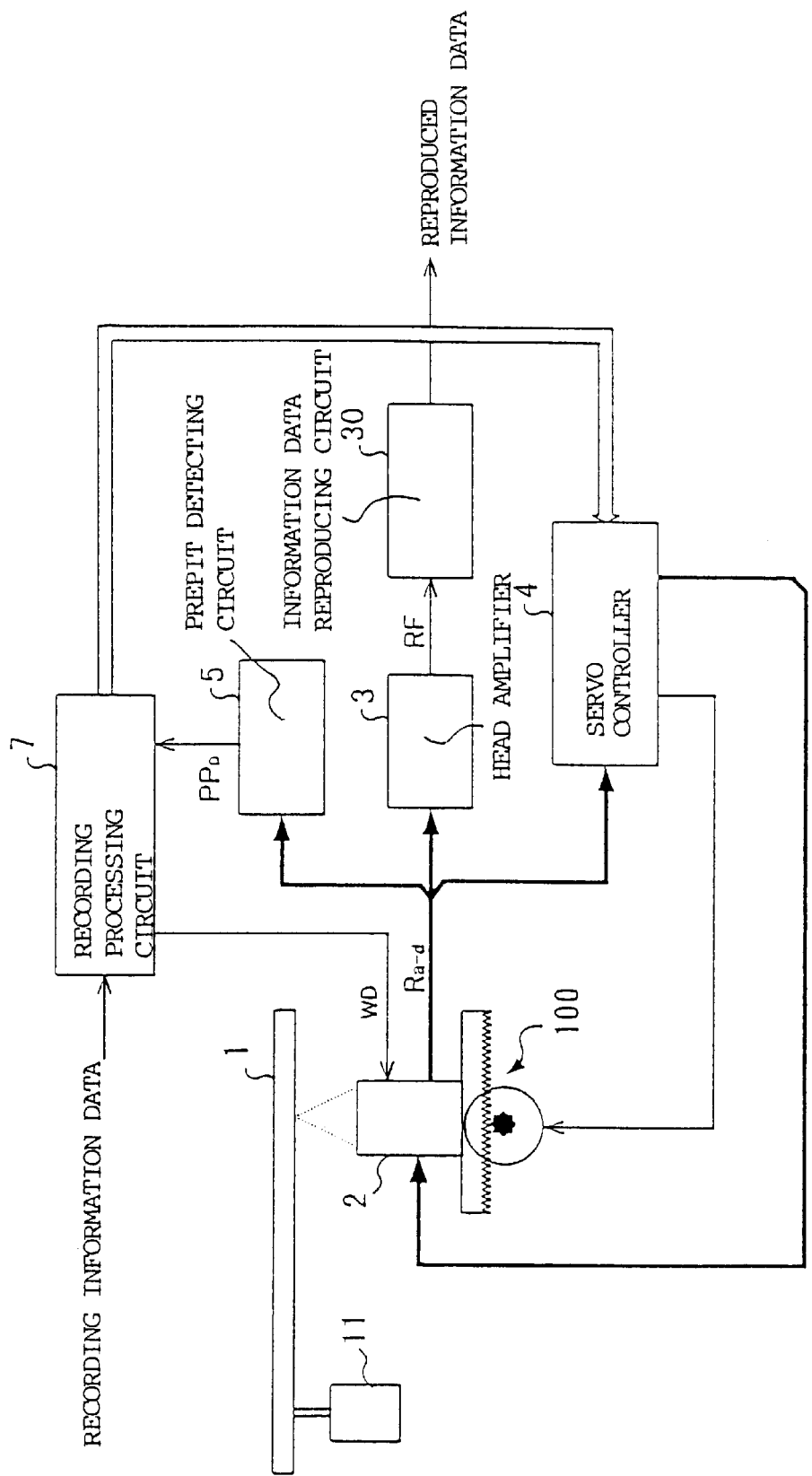
FIG. 4 is a block diagram illustrating the configuration of an information recording/reproducing apparatus for recording and reproducing information data on and from the DVD according to the present invention.

FIG. 4 is a block diagram illustrating the configuration of an information recording/reproducing apparatus for recording and reproducing information data on and from the DVD.

Referring specifically to FIG. 4, a recording/reproducing head 2 is equipped with a recording beam light generator (not shown) for recording information data on the DVD 1 as a write-once or rewritable optical recording medium having the configuration as illustrated in FIG. 3; a reading beam light generator (not shown) for reading recorded information (including information data) from the DVD 1; and a quadrant photodetector.

Figure 5:
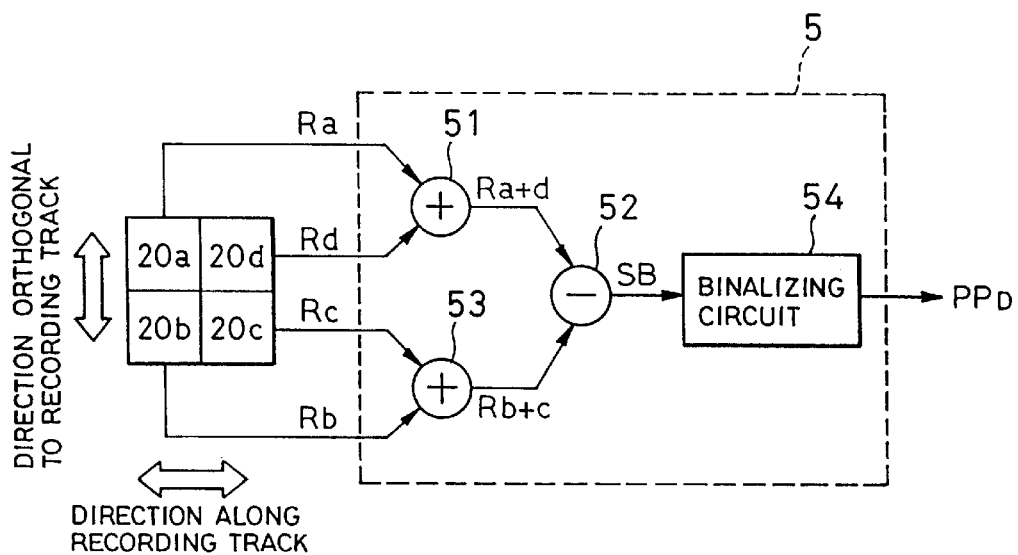
FIG. 5 is a block diagram illustrating the internal configuration of a quadrant photodetector and a prepit detecting circuit 5.

The reading beam light generator irradiates reading beam light to the DVD 1 driven by a spindle motor 11 to rotate, to form an information reading spot on the recording surface. The quadrant photodetector comprises an opto-electric transducing element divided into four light receiving surfaces 20a–20d in a direction along the recording tracks (groove tracks GV) of the DVD 1 and in the direction orthogonal to the recording tracks, as illustrated in FIG. 5. The opto-electric transducing element receives the information reading spot reflected from the DVD 1, i.e., reflected light on each of the four light receiving surfaces 20a–20d which individually transduce the received light to electric signals which are then output as read signals Ra–Rd.

A servo controller 4 generates a focus error signal, a tracking error signal, and a slider driving signal based on the read signals Ra–Rd. The servo controller 4 controls a focusing actuator (not shown) equipped in the recording/reproducing head 2 based on the focus error signal. In this event, the focusing actuator adjusts the focus of the information reading spot based on the focus error signal. The servo controller 4 also controls a tracking actuator (not shown) equipped in the recording/reproducing head 2 based on the tracking error signal. In this event, the tracking actuator offsets the position at which the information reading spot is formed in the radial direction of the disc based on the tracking error signal. Further, the servo controller 4 controls a slider 100 based on the slider driving signal. In this event, the slider 100 transports the recording/reproducing head 2 in the radial direction of the disc at a speed corresponding to the slider driving signal.

Figure 1:
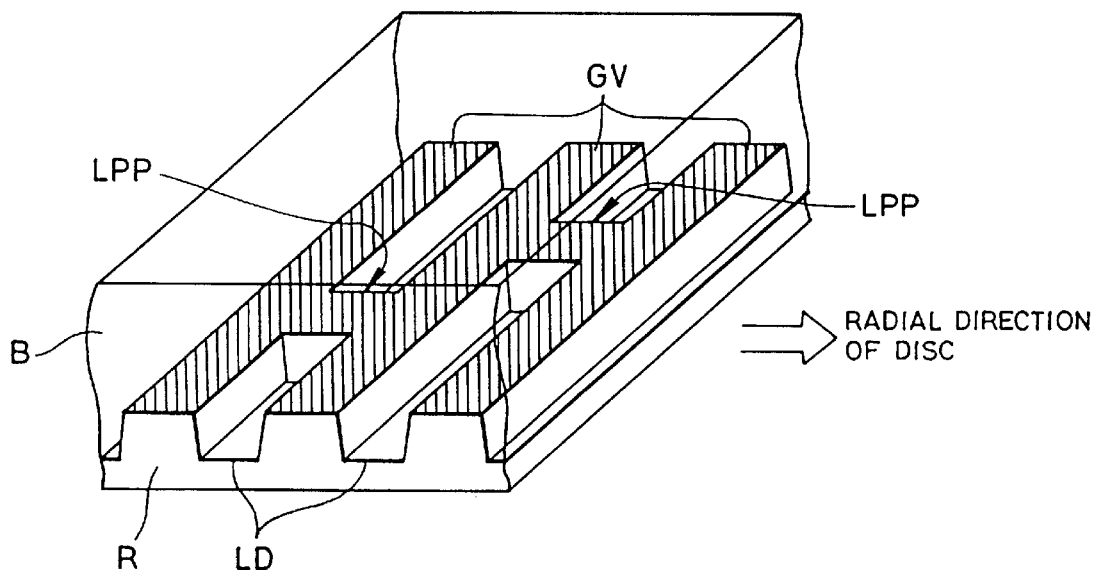
FIG. 1 is a perspective view illustrating a recording surface and a cross section of a conventional write-once or rewritable DVD.
Figure 2:
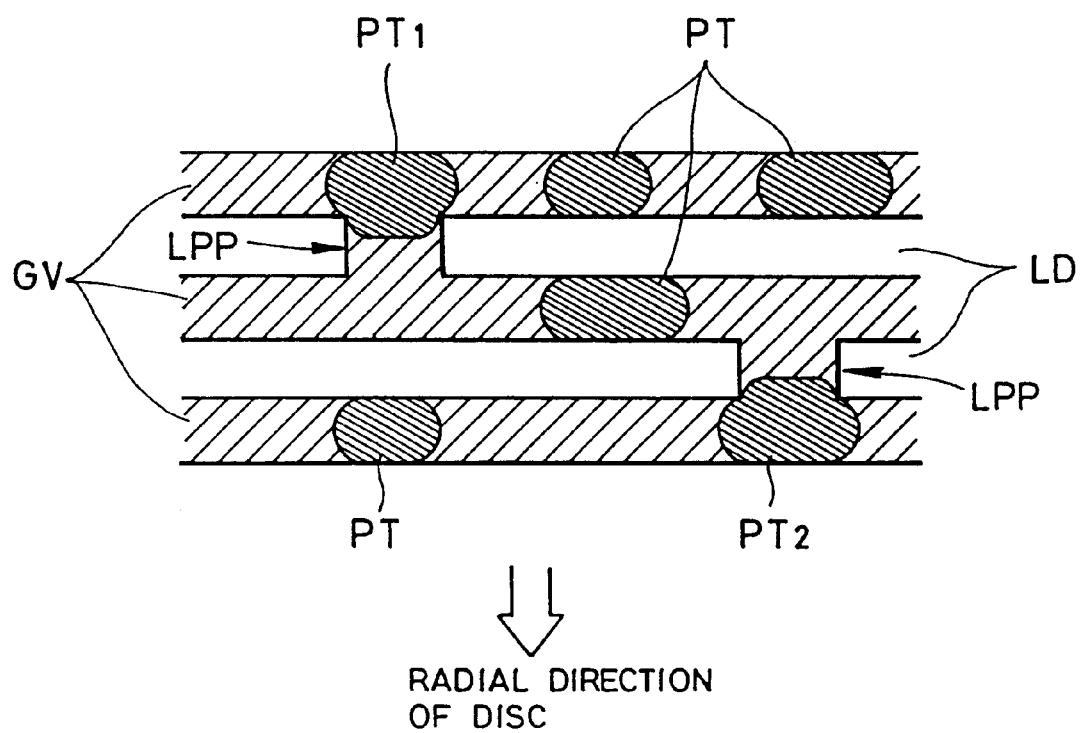
FIG. 2 is a diagram illustrating an exemplary configuration on a recording surface when information pits are formed on the DVD illustrated in FIG. 1.

The prepit detecting circuit 5 detects land prepits LPP formed on the land tracks LD on the DVD 1, as illustrated in FIG. 1, based on the read signals Ra–Rd to generate a prepit detecting signal $PP_D$ which is supplied to a recording processing circuit 7.

FIG. 5 illustrates the internal configuration of the prepit detecting circuit 5.

Referring specifically to FIG. 5, an adder 51 adds the read signals Ra, Rd transduced from light received by the light receiving surfaces 20a, 20d of the quadrant photodetector to electrical signals to produce an addition read signal $R_{a+d}$ which is supplied to a subtractor 52. Another adder 53 in turn adds the read signals Rb, Rc transduced from light received by the light receiving surfaces 20b, 20c of the quadrant photodetector to electrical signals to produce an addition read signal $R_{b+c}$ which is supplied to the subtractor 52. The subtractor 52 subtracts the addition read signal $R_{b+c}$ from the addition read signal $R_{a+d}$ to produce a differential signal SB which is supplied to a binarizing circuit 54. The binarizing circuit 54 binarizes the differential signal SB based on a predetermined threshold value, and outputs the resultant signal as the aforementioned prepit detecting signal $PP_D$.

Figure 6:
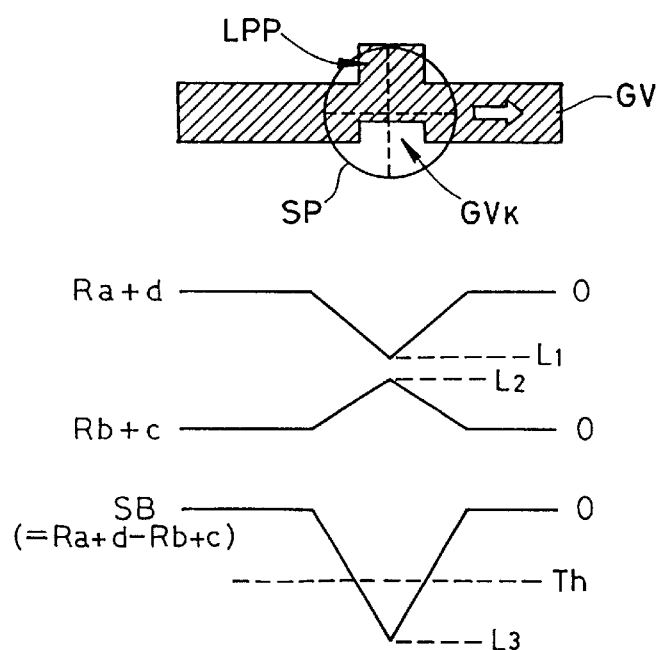
FIG. 6 illustrates waveforms showing operations within the prepit detecting circuit 5.

FIG. 6 illustrates the waveforms of the addition read signal $R_{a+d}$, the addition read signal $R_{b+c}$ and the differential signal SB which are produced when an information reading spot SP traces a grove track GV on the DVD 1 before information data is recorded thereon.

As illustrated in FIG. 6, each of the addition read signal $R_{a+d}$ and the addition read signal $R_{b+c}$ presents a "zero" value when the information reading spot SP is tracing the groove track GV on the DVD 1. However, as the information reading spot SP traverses a land prepit LPP, the amount of light received by each of the light receiving surfaces 20a, 20d of the quadrant photodetector decreases due to the diffraction of the land prepit LPP. On the other hand, since the diffracted light due to the land prepit LPP is incident on each of the light receiving surfaces 20b, 20c, the amount of light received thereby increases. Thus, as illustrated in FIG. 6, the addition read signal $R_{a+d}$ gradually decreases from a "zero" state to a minimum value $L_1$, while the addition read signal $R_{b+c}$ gradually increases from a "zero" state to a maximum value $L_2$. Subsequently, as the information reading spot SP moves away from the land prepit LPP, the addition read signal $R_{a+d}$ gradually increases from the minimum value $L_1$ to the "zero" state, while the addition read signal $R_{b+c}$ gradually decreases from the maximum value $L_2$ to the "zero" state. Consequently, the differential signal SB produced by subtracting the addition read signal $R_{b+c}$ from the addition read signal $R_{a+d}$ exhibits the waveform having a minimum value $L_3$, as illustrated in FIG. 6, which is derived by subtracting the maximum value $L_2$ from the minimum value $L_1$. Thus, as the differential signal SB is binarized by the binarizing circuit 54 with a predetermined threshold value Th, the prepit detecting signal $PP_D$ can be produced as indicative of the time at which the land prepit LPP is traced.

While the addition read signal $R_{a+d}$ and the addition read signal $R_{b+c}$ having the waveforms as illustrated in FIG. 6 are produced likewise when a land prepit LPP is detected from the conventional DVD as illustrated in FIG. 1, absolute values of the minimum value $L_1$ and the maximum value $L_2$ produced from the DVD according to the present invention as illustrated in FIG. 3 are larger than those produced from the conventional DVD. This is because in the DVD according to the present invention, the track width of the groove track GV is reduced by the groove track indentation $GV_K$ in a portion connected with the land prepit LPP on the groove track GV, as can be seen in FIG. 3. Stated another way, by reducing the track width of the groove track GV in a portion connected with the land prepit LPP on the groove track GV, the respective addition read signal $R_{a+d}$ and addition read signal $R_{b+c}$ have increased absolute values of the minimum value $L_1$ and the maximum value $L_2$.

Thus, according to the DVD of the present invention as illustrated in FIG. 3, the absolute value of the minimum value $L_3$ of the differential signal SB produced when the land prepit LPP is traced is larger than that produced when the land prepit LPP is traced on the conventional DVD as illustrated in FIG. 1. Consequently, a wider dynamic range is ensured when the differential signal SB is binarized with the predetermined threshold value Th, as illustrated in FIG. 6, thereby resulting in a higher detection accuracy for the land prepit detecting signal $PP_D$.

The signal processing circuit 7 recognizes the position at which the recording/reproducing head 2 is currently recording, i.e., the position above the groove track GV, based on the prepit detecting signal $PP_D$, and supplies the servo controller 4 with a control signal for causing the recording/reproducing head 2 to jump from the currently recording position to a desired recording position. Further, the recording processing circuit 7 performs desired recording modulation processing on information data to be recorded to produce a recording modulated data signal which is supplied to the recording/reproducing head 2. The recording beam light generator equipped in the recording/reproducing head 2 generates recording beam light in accordance with the recording modulated data signal thus produced, and irradiates the resultant recording beam light onto the groove track GV on the DVD 1. In this event, heat is conducted to a region on the groove tracks GV irradiated with the recording beam, resulting in the formation of information pits PT in that region as illustrated in FIG. 7.

Figure 7:
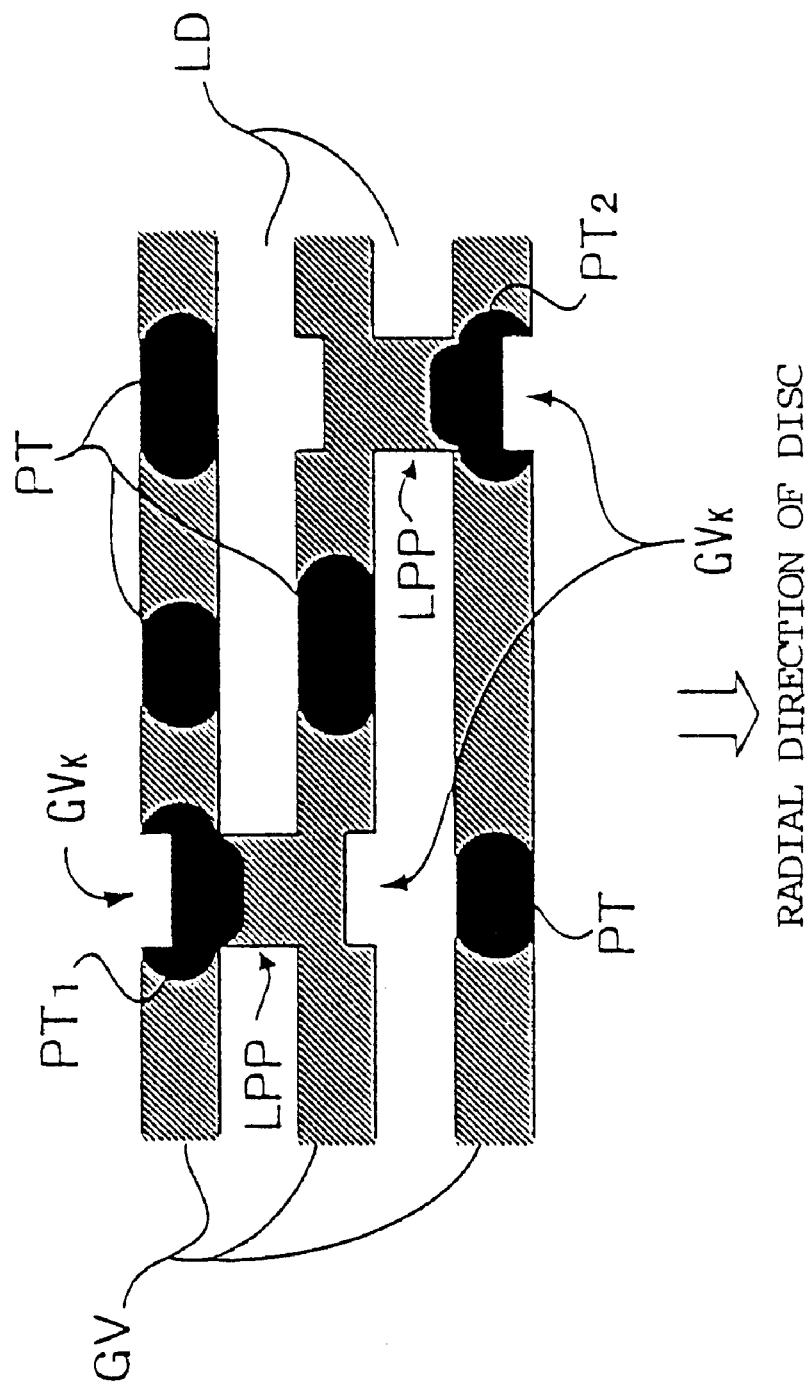
FIG. 7 is a diagram illustrating an exemplary configuration of a recording surface of the DVD illustrated in FIG. 3 when information pits are recorded thereon.

It should be noted that as the recording beam light is irradiated to a position on the groove tracks GV including land prepits LPP, deformed information pits $PT_1$, $PT_2$ are formed as can be seen in FIG. 7. In this event, each of the information pits $PT_1$, $PT_2$ has its information bit region extending into a portion of the land prepit LPP to increase the pit area. However, the increased pit area is canceled by the reduced track width of the groove track GV by the groove track indentation $GV_K$ to reduce the pit area. In other words, although the information pits $PT_1$, $PT_2$ have deformed pit shapes, the ratio of the pit area to the pit length is the same as that of an information pit PT having a normal shape.

For reproducing information data from the DVD 1 on which information data have been recorded as illustrated in FIG. 7, a head amplifier 3 in FIG. 4 calculates the sum of read signals Ra–Rd supplied from the quadrant photodetector of the recording/reproducing head 2, and amplifies the sum signal to produce an information read signal RF which is supplied to an information data reproducing circuit 30. The information reproducing circuit 30 binarizes the information read signal RF, and subsequently performs demodulation, error correction, and a variety of information decoding processing on the binarized information read signal RF in sequence, thereby reproducing and outputting information data (video data, audio data, computer data) recorded on the DVD 1.

In this event, at the position of the groove track GV of the DVD 1 connected to the land prepit LPP, deformed information pits $PT_1$, $PT_2$ may exist as illustrated in FIG. 7. However, as described above, the ratio of the pit area to the pit length of the respective information pits $PT_1$, $PT_2$ is the same as that of a information pit PT having the normal shape, so that their influence on the diffraction is also identical to that when reading beam light is irradiated to the information pit PT having the normal shape.

As appreciated from the foregoing, with the DVD according to the present invention, a good read signal free from waveform distortion can be produced therefrom.

Figure 8:
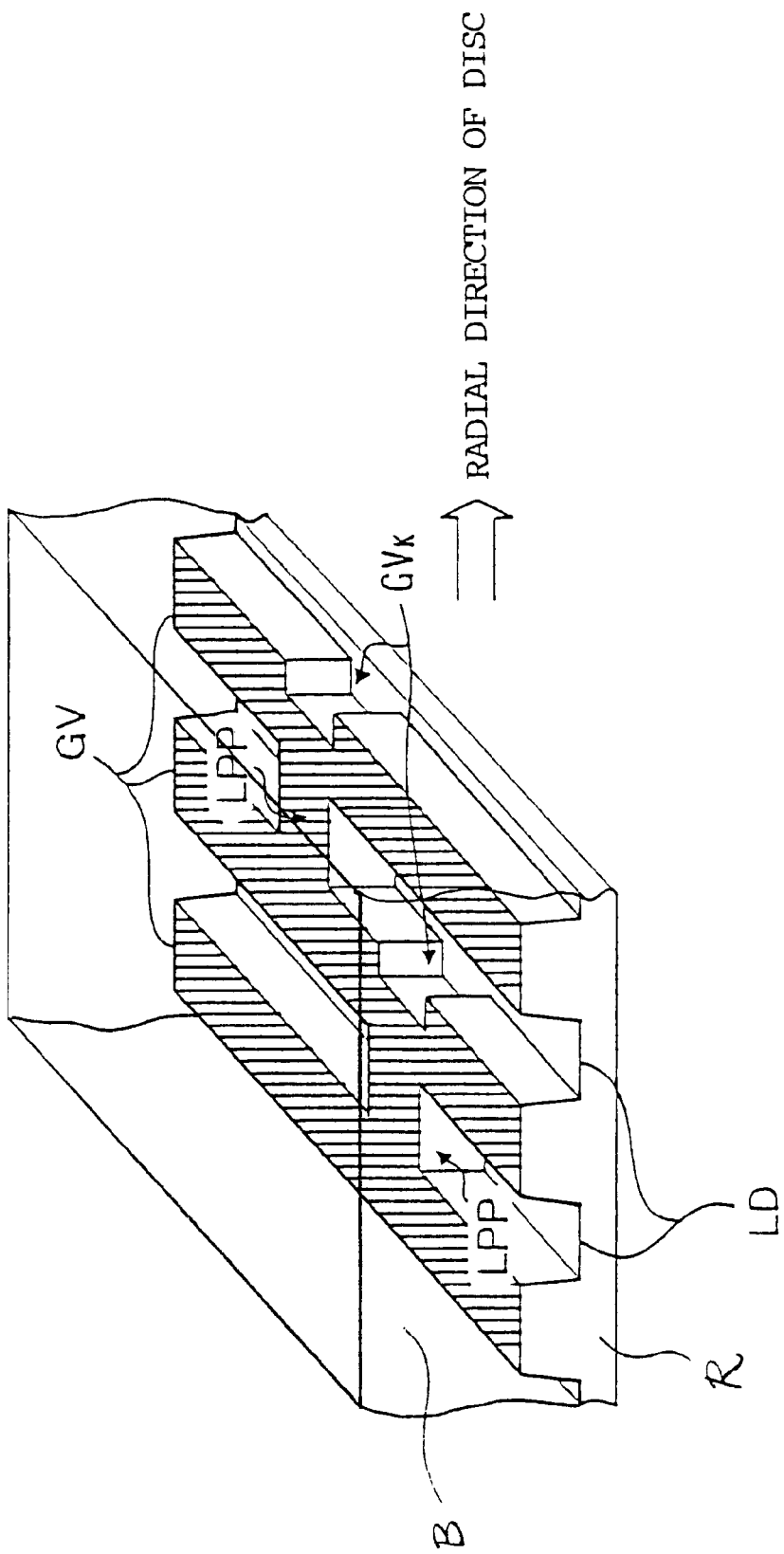
FIG. 8 is a perspective view illustrating another structure of the recording surface of the DVD according to the present invention.

In the embodiment illustrated in FIG. 3, the track width of the respective groove tracks GV positioned on both sides of the land prepit LPP is reduced by the groove track indentation $GV_K$. Alternatively, as illustrated in FIG. 8, the groove track indentation $GV_K$ may be formed in either one of the two groove tracks GV in a connecting region with the land prepit LPP to reduce the track width.

Also alternatively, while the land prepit LPP in the foregoing embodiment is connected to groove tracks GV on both sides which sandwich the land prepit LPP therebetween, the land prepit LPP may be spaced apart from one of the groove tracks GV.

Figure 9:
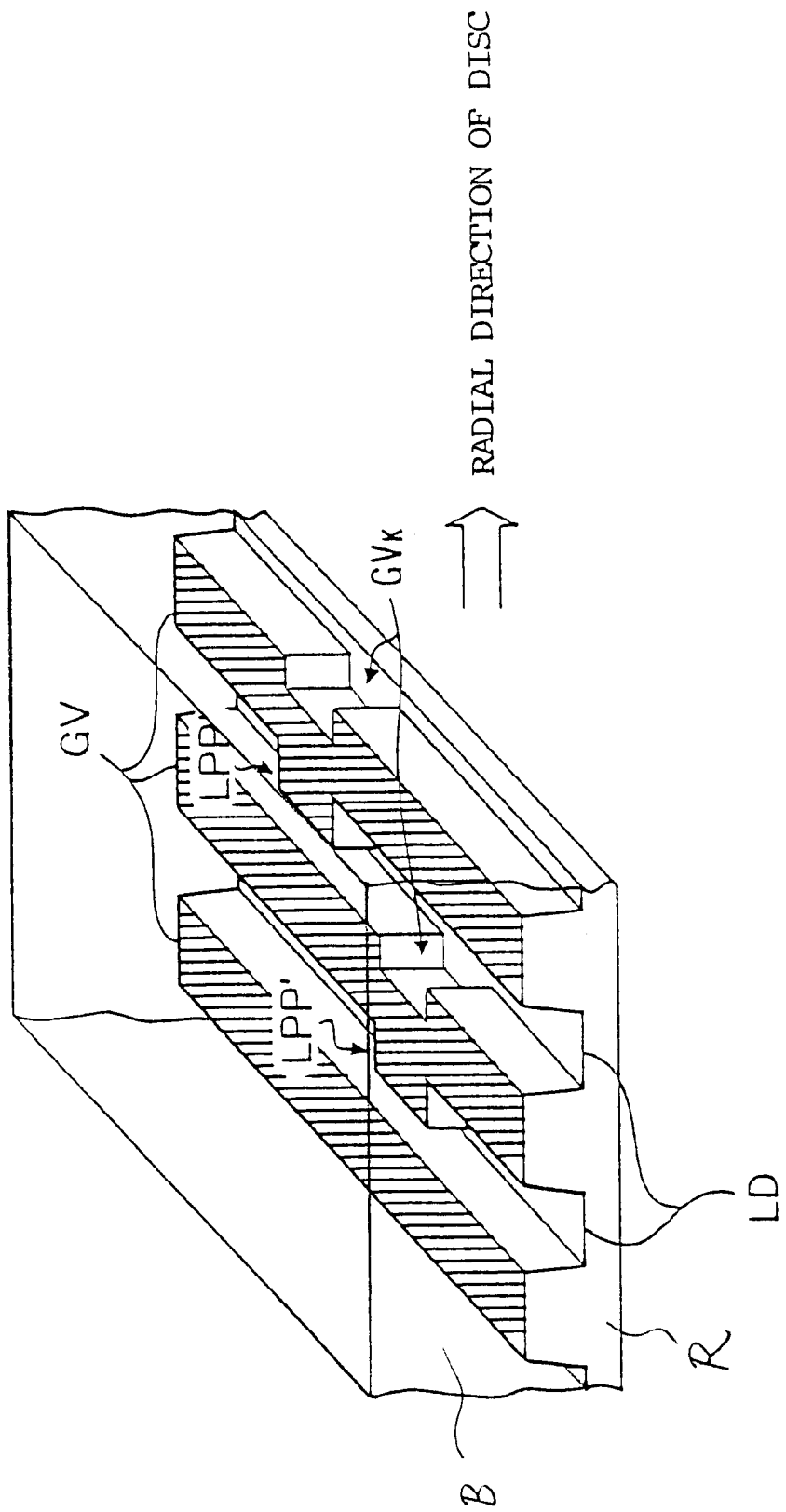
FIG. 9 is a perspective view illustrating a further structure of the recording surface of the DVD according to the present invention.

FIG. 9 is a perspective view illustrating another structure of the recording surface of the DVD according to the present invention which has been designed in view of the foregoing alternative land prepits.

A land track LD on the DVD illustrated in FIG. 9 is previously formed with a plurality of land prepits LPP' serving as addresses for recognizing particular positions on groove tracks GV, and as recording timing. Each of the land prepits LPP' is formed in such a manner that it is connected to only one of two groove tracks GV which sandwich it, and it is spaced apart from the remaining one. Further, each groove track GV connected to the land prepit LPP' is formed with a groove track indentation $GV_K$.

Figure 10:
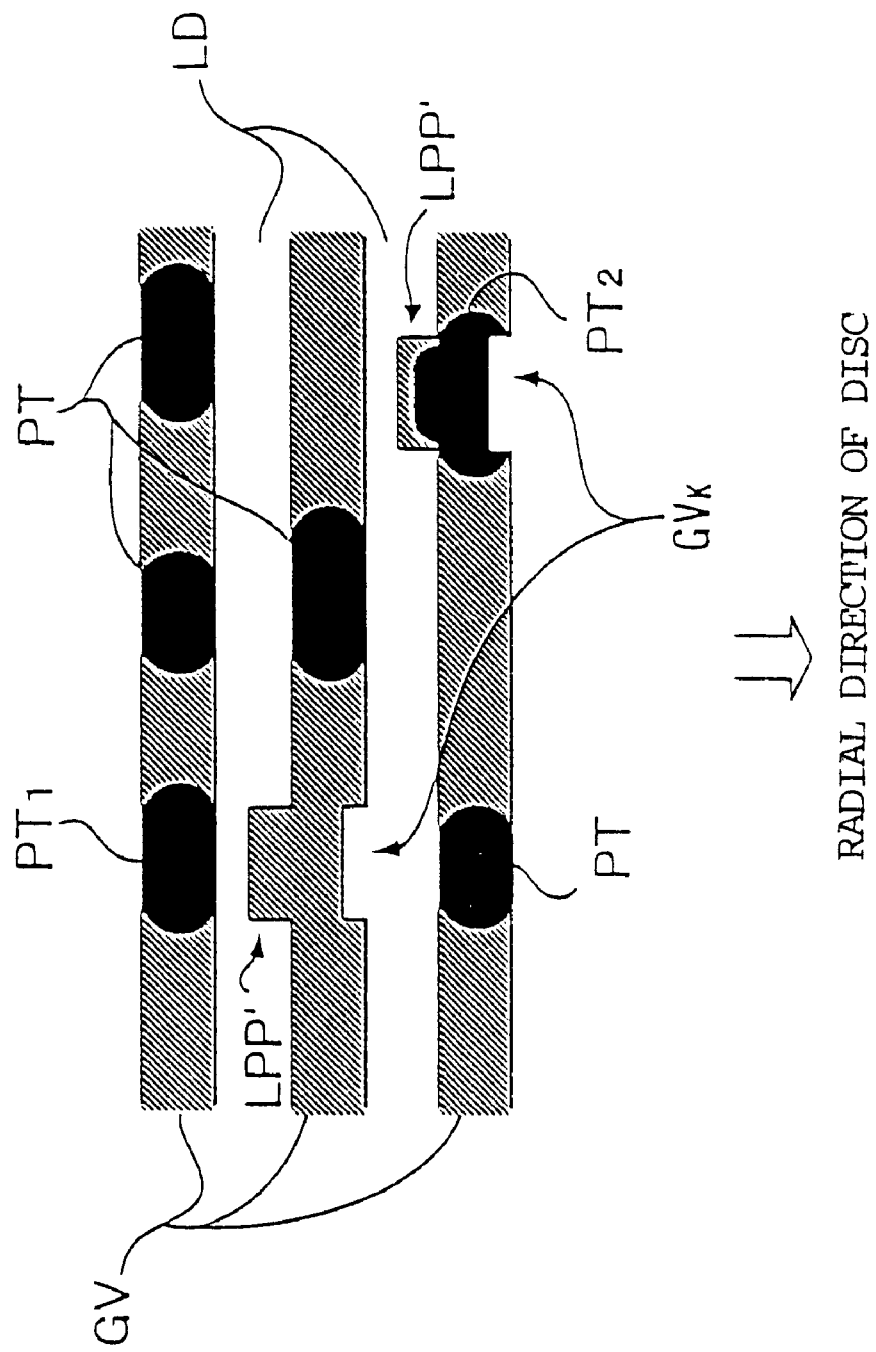
FIG. 10 is a diagram illustrating an exemplary configuration of a recording surface of the DVD illustrated in FIG. 9 when information pits are recorded thereon.

FIG. 10 is a diagram illustrating an exemplary configuration formed by recording information data on the DVD illustrated in FIG. 9.

As can be seen in FIG. 10, when recording beam light is irradiated to a position of a groove track GV continuous to a land prepit LPP', a deformed information pit $PT_2$ is formed likewise on the DVD illustrated in FIG. 9. In this event, however, although the information pit $PT_2$ has a deformed pit shape, the ratio of the pit area to the pit length is the same as that of an information pit PT having the normal shape, as described above.

Consequently, the structure illustrated in FIG. 9, when employed, also provides a good read signal free from waveform distortion during reproduction of information data, as is the case with the structure illustrated in FIG. 3.

For manufacturing DVDs having the configuration as illustrated in FIG. 9, it is necessary to create an original disc which is formed with concave groove tracks GV and land prepits LPP'. Thus, before creating the original disc, a mask pattern having the configuration of the groove tracks GV and the land prepits LPP' should be first created by laser cutting.

Figure 11:
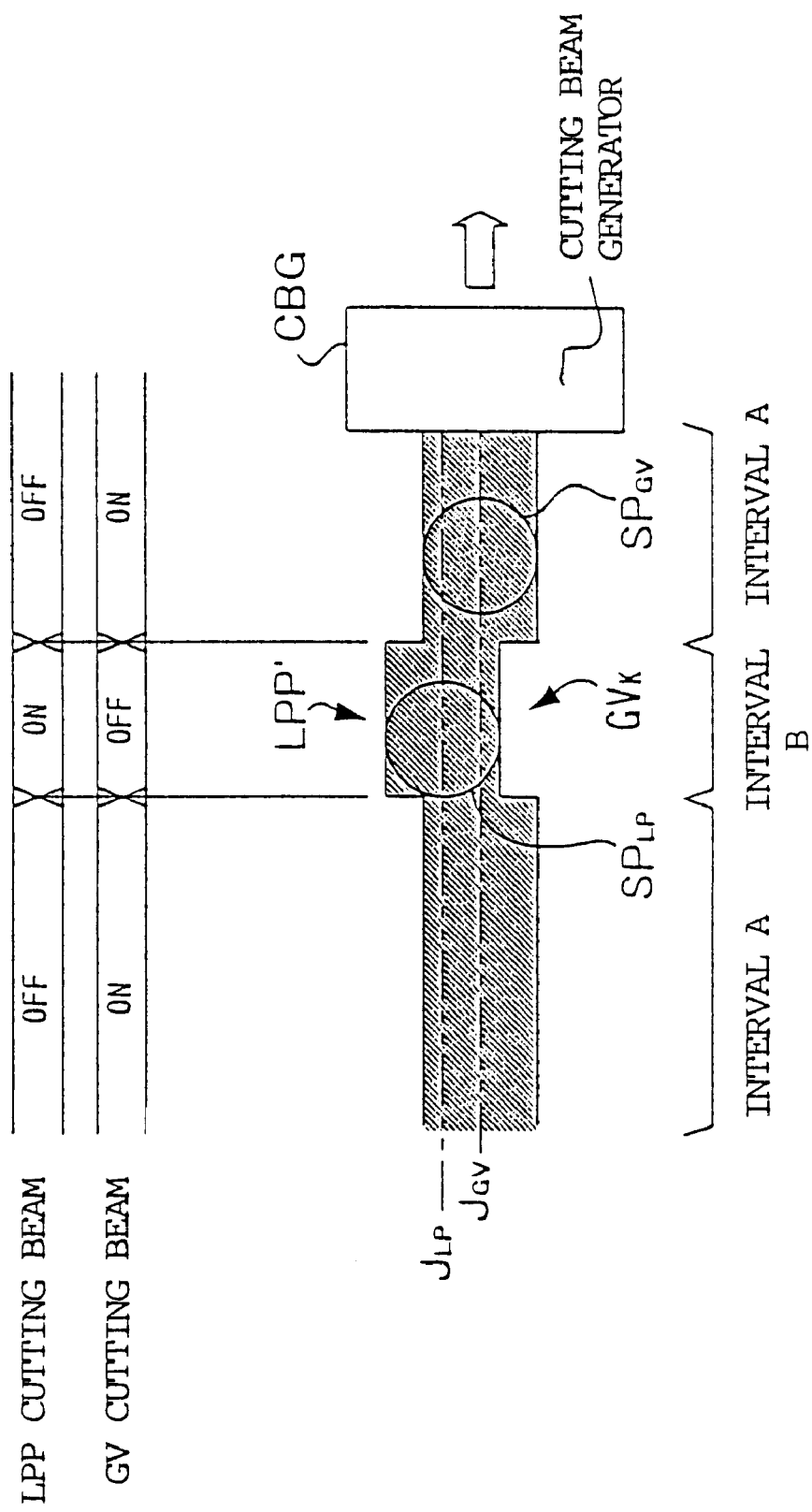
FIG. 11 is a diagram for explaining an operation for cutting a mask pattern used for manufacturing the DVD illustrated in FIG. 9.

FIG. 11 is a diagram for explaining a laser cutting operation involved in the creation of the mask pattern.

Referring specifically to FIG. 11, a cutting beam generator CBG irradiates a mask sheet with one of a cutting beam for groove track GV and a cutting beam for land prepit LPP, while it is moved in the direction indicated by the white outlined arrow as illustrated. Specifically, as can be seen in FIG. 11, the mask sheet is irradiated only with the cutting beam for groove track GV in an interval A, and the mask sheet is irradiated only with the cutting beam for land prepit LPP in an interval B. In this event, the cutting beam for groove track GV is irradiated to trace a virtual line $J_{GV}$ on the mask sheet as illustrated in FIG. 11, while the cutting beam for land prepit LPP is irradiated to trace a virtual line $J_{LP}$. With these cutting beams, the mask sheet is irradiated with a beam spot $SP_{GV}$ having the center axis on the virtual line $J_{GV}$ in the interval A, and with a beam spot $SP_{LP}$ having the center axis on the virtual line $J_{LP}$ in the interval B. As a result, a cutting pattern CP as indicated by hatching in FIG. 9 is formed on the mask sheet in a region which has been irradiated with the beam spot $SP_{GV}$ and beam spot $SP_{LP}$. In this process, the operation in the intervals A, B as illustrated in FIG. 11 results in a cutting pattern for the formation of the groove tracks GV on the mask sheet, and the operation in the interval B results in the formation of a cutting pattern for land prepits LPP' on the mask sheet.

FIGS. 12A to 12C show a further embodiment of the present invention. In this embodiment, the land prepit LPP is formed by shifting a cutting beam $SP_{GV}$ of the groove GV in a disc's radial direction, and a laser power of the cutting beam $SP_{GV}$ is raised for a predetermined period, as illustrated in the drawings. The position of the cutting beam $SP_{GV}$ is controlled by a tracking offset signal shown in FIG. 12B, so that it is gradually shifted in the disc's radial direction and subsequently gradually returns to an initial position during a period between times $t_1$ and $t_3$ as depicted by the chain line $J_{GV}$ in FIG. 12C. As shown in FIG. 12A, the laser power of the cutting beam is made high during a period between times $t_1$ and $t_2$. As a result of this control operation, the beam size of the cutting beam $SP_{GV}$ is being enlarged during a certain period after the time t1, and is being decreased during a certain period after the time t2. Consequently, as depicted in the middle one of three shaded bands, the land prepit LPP of a curved shape is created by the shift of the position of the cutting beam $SP_{GV}$ and the increase of the beam size of the cutting beam $SP_{GV}$ during a period $A_1$ (the period between times t1 and t3). Similarly, the track width of the groove track (the part excluding the land prepit LPP) is decreased during a period $A_2$ (the period from a time between the times t1 and t2 to the time t3). In FIG. 12C, the upper and lower shaded bands represent adjacent groove tracks GV. By the operation described above, the land prepit LPP is formed in the section $A_1$ and the track width of the groove track GV is made narrower in the period $A_2$ having a duration shorter than a duration of the period $A_1$.

In the embodiment shown in FIG. 12A through 12C, both of the section $A_1$ in which the land prepit LPP is formed and the period $A_2$ in which the track width of the groove track GV is narrowed end at the same time t3, the time relationship between the periods $A_1$ and $A_2$ is not limited to this embodiment. For instance, the laser power-up signal and the tracking offset signal may be controlled so that the period $A_2$ in which the track width is narrowed ends earlier than the period $A_1$.

While the DVD illustrated in the foregoing embodiment is formed with the groove tracks GV in convex and the land tracks LD in concave, their shapes may be reversed, i.e., the groove tracks GV may be concave, and the land tracks LD be convex.

As described above, according to the optical recording medium of the present invention, even if a deformed information pit is formed on a groove track due to heat generated by an irradiated recording beam and conducted to a land prepit through the groove track, a read signal free from waveform distortion can be produced from the optical recording medium.

What is claimed is:

1. An optical recording medium comprising:

groove information tracks on which information pits carrying information data are to be formed; and land prepit tracks provided with a plurality of previously formed land prepits, wherein said groove information tracks and said land prepit tracks are arranged in alternation, said land prepits are connected to said groove information track, and said groove information track has a smaller track width in at least a part of each of sections in which said land prepit exists than in sections in which no land prepit exists.

2. An optical recording medium comprising:

groove information tracks on which information pits carrying information data are to be formed; and land prepit tracks provided with a plurality of previously formed land prepits, wherein said groove information tracks and said land prepit tracks are arranged in alternation, said land prepits are connected to said groove information track, and said groove information track has a smaller track width in at least a part of each of sections in which said land prepit exists than in sections in which no land prepit exists, and wherein each of said land prepits is connected to both of two of said groove information tracks positioned adjacent to land prepit.

3. An optical recording medium comprising:

groove information tracks on which information pits carrying information data are to be formed; and land prepit tracks provided with a plurality of previously formed land prepits, wherein said groove information tracks and said land prepit tracks are arranged in alternation, said land prepits are connected to said groove information track, and said groove information track has a smaller track width in at least a part of each of sections in which said land prepit exists than in sections in which no land prepit exists, and wherein each of said land prepits is connected to both of two of said groove information tracks positioned adjacent to said land prepit; and one of said two groove information tracks has a smaller track width in at least a part of each sections in which said land prepit exists than in sections in which no land prepit exists.

4. An optical recording medium according to claim 1, wherein each of said land prepits is connected to one of two of said groove information tracks positioned adjacent to said land prepit, and spaced apart from the other of said groove information tracks.

5. An optical recording medium according to claim 4, wherein each of said land prepits has a curved shape that is defined by bent parts of outlines of said groove information track.

6. A method for producing an optical recording medium having a groove information track for forming information pits carrying information data and a land prepit track connected to said groove information track, said land prepit track having a plurality of land prepits formed previously, said method comprising:

a step of shifting a position of a spot of a cutting light beam on a mask sheet in a direction perpendicular to a direction in which said groove information track is to extend;

a step of returning the position of said spot of said cutting light beam after being shifted, wherein, in at least one part of each of sections where said land prepits exist, a track width of said groove information track is made narrower than the track width at sections where said land prepits are absent.

7. A method for producing an optical recording medium having a groove information track for forming information pits carrying information data and a land prepit track connected to said groove information track, said land prepit track having a plurality of land prepits formed previously, said method comprising:

a step of shifting a position of a spot of a cutting light beam on a mask sheet in a direction perpendicular to a direction in which said groove information track is to extend;

a step of returning the position of said spot of said cutting light beam after being shifted, wherein in at least one part of each of sections where said land prepits exist, a track width of said groove information track is made narrower than the track width at sections where said land prepits are absent, wherein a laser power of said cutting light beam is increased for a predetermined period in at least one of sad step of shifting and said step of returning the position of the spot of the cutting light beam.

8. An optical recording medium according to claim 1, wherein groove track indentation of said groove track has a smaller width than said land prepit.

9. An optical recording medium according to claim 4, wherein groove track indentation of said groove track has a smaller width than said land prepit.

10. An optical recording medium according to claim 5, wherein groove track indentation of said groove track has a smaller width than said land prepit.

* * * * *